United States Patent
Dinan (10) Patent No.: US 8,250,423 B2
(45) Date of Patent: Aug. 21, 2012

(54) METHOD AND SYSTEM FOR IMPROVING PERFORMANCE OF BROADCAST/MULTICAST TRANSMISSIONS

(75) Inventor: Esmail Dinan, Herndon, VA (US)

(73) Assignee: Clear Wireless LLC, Kirkland, WA (US)

( * ) Notice: Subject to any disclaimer, the term of this patent is extended or adjusted under 35 U.S.C. 154(b) by 820 days.

(21) Appl. No.: 12/410,008

(22) Filed: Mar. 24, 2009

(65) Prior Publication Data

US 2010/0251056 A1    Sep. 30, 2010

(51) Int. Cl.
*G08C 25/02* (2006.01)
(52) U.S. Cl. .................. 714/748; 714/749; 370/278
(58) Field of Classification Search .............. 370/235, 370/252, 236, 468, 278; 714/748, 749
See application file for complete search history.

(56) References Cited

U.S. PATENT DOCUMENTS

| | | | |
|---|---|---|---|
| 7,200,115 B2 * | 4/2007 | Khan et al. | 370/236 |
| 7,911,954 B2 * | 3/2011 | Cheng et al. | 370/235 |
| 7,978,626 B1 * | 7/2011 | Khanka et al. | 370/252 |
| 7,990,920 B2 * | 8/2011 | Zhang et al. | 370/329 |
| 2006/0256740 A1 | 11/2006 | Koski | |
| 2007/0110095 A1 | 5/2007 | Attar et al. | |
| 2007/0223404 A1 * | 9/2007 | Khan et al. | 370/278 |
| 2007/0223526 A1 * | 9/2007 | Jiang | 370/468 |
| 2009/0016265 A1 | 1/2009 | Katayama et al. | |

\* cited by examiner

*Primary Examiner* — David Ton
(74) *Attorney, Agent, or Firm* — McDonnell Boehnen Hulbert & Berghoff LLP (57) ABSTRACT

Methods and systems for performing hybrid automatic repeat request (ARQ) in conjunction with broadcast/multicast channels are presented. In particular, an access node may transmit a series of hybrid ARQ subpackets to one or more client nodes using a broadcast/multicast channel. Each of the subpackets may be derived from the same full packet. Upon receiving a subpacket, a client node may attempt to decode the full packet from the subpacket(s) derived from the full packet. If the client node fails to do so, the client node may transmit a negative acknowledgement to the access node. If the access node receives more than a threshold extent of negative acknowledgements, the access node may transmit a subsequent subpacket in the series on the broadcast/multicast channel.

21 Claims, 8 Drawing Sheets

METHOD AND SYSTEM FOR IMPROVING PERFORMANCE OF BROADCAST/MULTICAST TRANSMISSIONS

BACKGROUND

As packet-switched communication systems slowly replace traditional circuit-switched communication systems, multimedia services are being developed to operate over packet-switching infrastructure. Some of these multimedia services are effectively broadcast/multicast services, in that the bulk of the media, or bearer traffic, flows in one direction. Examples of these services include audio services, such as Internet radio, and audio/video services, such as Internet Protocol Television (IPTV).

Broadcast/multicast services place additional requirements on packet-switching networks. Not only do these services usually consume a considerable amount of capacity, they also may require a special communication channel structure so that the media can be delivered efficiently from a limited number of sources to a potentially enormous number of client nodes.

For example, in wide-area cellular networks, a single broadcast/multicast channel can be employed to deliver media from one source to tens, hundreds, or thousands of client nodes. Such an arrangement is far more efficient than requiring each client node to listen on a dedicated unicast channel.

However, communication networks in general, and wireless networks in particular, are subject to impairments that can lead to packet corruption and packet loss. For instance, a wireless signal can suffer from various types of attenuation, reflections, and/or interference. In order to address these problems, and to reduce the effective packet loss rate of a channel, forward error correction (FEC) schemes may be used.

In general, FEC schemes permit a transmitting device, such as an access node, to transmit multiple copies of part or all of a full packet to a client node. Some copies may include FEC coding, for example XOR coding, Reed-Solomon coding, or turbo codes. If a client node receives a packet with errors, it may be able to apply FEC codes contained within the packet, or contained within packets it has previously received or will subsequently receive, to properly decode the packet. In this way, packet error rates are reduced.

One particularly effective method of implementing FEC is through the use of hybrid automatic repeat request (ARQ). Using hybrid ARQ, an access node that seeks to transmit a full packet instead transmits a series of one or more subpackets. Each of these subpackets may be derived from the full packet, and therefore may contain copies of part or all of the full packet. Each subpacket may also contain an extent of FEC coding. The client node transmits a negative acknowledgment (NACK) for each subpacket it receives until the client node can decode the full packet from the series of subpackets. Once the client node is able to decode the full packet, it may transmit an acknowledgment (ACK) to the access node.

The use of hybrid ARQ may be able to reduce packet error rates of 10% or more to a negligible level. However, hybrid ARQ requires that one or more feedback channels exist so that each client node can transmit an ACK and/or NACK message to the access node. In a broadcast/multicast system with a large number of receivers, such feedback channels can become quickly overloaded with ACK and/or NACK messages. Additionally, these feedback channels may consume precious and limited wireless network capacity, while the implosion of ACKs and/or NACKs arriving at the access node from a large number of client nodes could overwhelm the access node's message processing ability.

OVERVIEW

It is desirable to provide methods for an access node to efficiently use hybrid ARQ on broadcast/multicast channels. In order to provide feedback in a hybrid ARQ-based broadcast/multicast system, each broadcast/multicast channel may be paired with a feedback channel. Client nodes may receive packets on a given broadcast/multicast channel, and may use the given broadcast/multicast channel's paired feedback channel to transmit NACKs to the access node. By suppressing the transmission of some or all ACKs, the load on the feedback channel and the access node may be reduced.

Furthermore, the feedback channel may be divided into a number of sub-channels. These sub-channels may be created by using code division multiple access (CDMA) or time division multiple access (TDMA) techniques on the feedback channel. For instance, under CDMA, logical sub-channels can be created through the use of a set of unique CDMA codes on the feedback channel. Similarly, under TDMA, logical sub-channels can be created through the use of multiple timeslots on the feedback channel.

Regardless of the exact multiple-access technology used, dividing a feedback channel into sub-channels provides a means with which multiple client nodes can share the feedback channel. Client nodes that transmit on the feedback channel may select a sub-channel. There are many potential ways for efficiently performing this selection, including but not limited to hashing a unique hardware identifier (e.g., an IEEE 802 style address) of the client node to a sub-channel, or just randomly choosing a sub-channel. Once a sub-channel is selected, the client node may transmit a NACK on the sub-channel.

If the access node receives more than a threshold number of NACKs for a given subpacket, it may determine that it should transmit the subsequent subpacket in the hybrid ARQ series of subpackets derived from a full packet. This threshold is preferably configurable, and may be as small as one NACK. Alternatively, the threshold can be based on a percentage of client nodes listening to the broadcast/multicast channel. For instance, the threshold can be set so that if more than 5% of these client nodes NACK a subpacket, the access node may transmit the next subpacket in the series. In this way, the access node can be configured to conserve wireless capacity by avoiding transmission of subsequent subpackets in the series when a relatively small number of client nodes NACK a subpacket.

Since multiple client nodes could potentially choose the same sub-channel, it is possible that more than one client node could transmit a NACK at the same time on the same sub-channel, resulting in a collision. Such a collision may render all NACKs distorted and effectively lost. To address this possibility, client nodes that transmit a NACK may listen on the broadcast/multicast channel for the next subpacket in the series. If such a client node does not receive the next subpacket, the client node may choose another sub-channel and transmit a NACK on the newly-chosen sub-channel.

An additional embodiment involves a system in which multiple broadcast/multicast channels share a feedback channel. In this arrangement, a number of sub-channels on the feedback channel are allocated to each broadcast/multicast channel. The allocation scheme may be such that each broadcast/multicast channel is granted an equal number of sub-channels, or that the number of sub-channels per broadcast/multicast channel is based on the number of client nodes receiving information on the broadcast/multicast channel. In the latter case, the number of sub-channels per broadcast/multicast channel can be adjusted dynamically as the number of client nodes receiving information on each broadcast/multicast channel changes.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

Disclosed herein are methods and systems for improving the performance of broadcast/multicast transmissions. An access node may use one or more wireless broadcast/multicast channels to transmit information to one or more client nodes. Each broadcast/multicast channel may be associated with one or more feedback channels and/or one or more sub-channels of one or more feedback channels. The access node and the client nodes may use hybrid ARQ procedures on the broadcast/multicast channels and the feedback channels to improve the delivery of information to the client nodes.

It should be appreciated that, for the embodiments described herein, the terms "random"or "randomly" shall refer to any realizable process of randomly generating events or randomly generating numbers. Such processes shall include, but not be limited to, generating events and/or numbers without a deterministic pattern of occurrences. Additionally, these processes may be pseudo-random, thus resulting in a deterministic pattern of events and/or numbers that exhibit some form of statistical randomness.

I. System Architecture

Figure 1A:
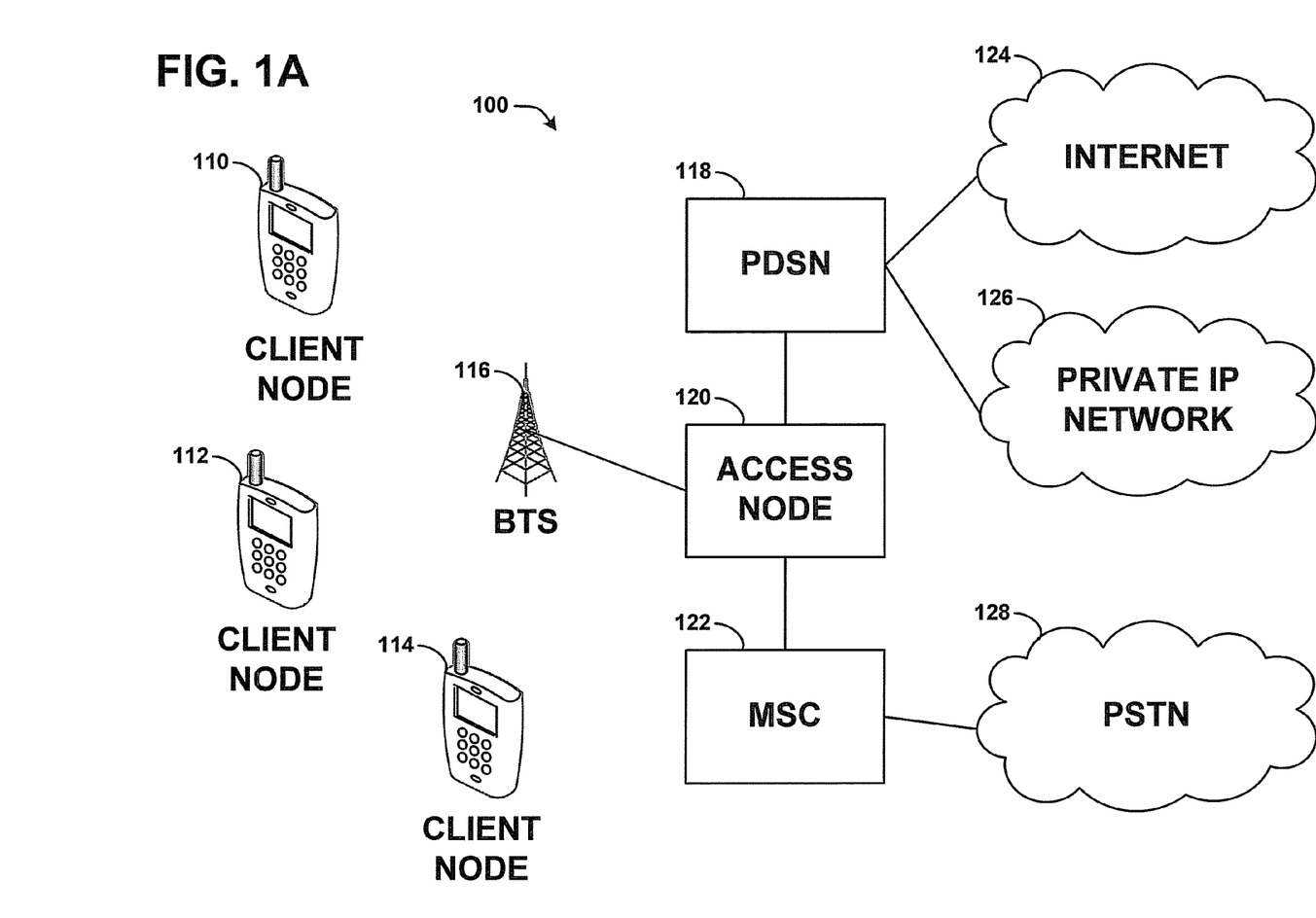
FIG. 1A depicts a communication system in accordance with a preferred embodiment.

FIG. 1A is a simplified block diagram of an exemplary communication network 100, in which exemplary embodiments may be employed. Network 100 includes base transceiver station (BTS) 116 that can communicate with client nodes 110, 112, 114 via a plurality of wireless coverage areas. Client nodes 110, 112, 114 could be wireless telephones, wireless personal digital assistants, wirelessly equipped laptop computers, wireless routers, or other types of mobile or fixed wireless devices.

BTS 116 may radiate to define some or all of the wireless coverage areas. Each wireless coverage area may provide air interface access to client nodes 110, 112, 114 and any other client nodes served by the wireless coverage area. In this regard, client nodes 110, 112, 114 may use the wireless coverage areas defined by BTS 116 to communicate with one or more endpoints. These endpoints may include other client nodes, e-mail servers, world wide web servers, gaming servers, media servers, media gateways, or location-based services. The communication may occur via a packet-switched network (e.g., the Internet 124 or private IP network 126), and/or a circuit-switched network, such as the public switched telephone network (PSTN) 128. (Alternatively, access node 120 may communicate with PSTN 128 via a media gateway (not shown) that bridges Internet 124 or private IP network 126 to PSTN 128.)

For example, BTS 116 may be communicatively coupled to access node 120. Access node 120 may comprise a base station controller (BSC), a radio network controller (RNC), or a similar type of device. Access node 120 may, in turn, be communicatively coupled to packet-switched networks 124, 126 via a packet data serving node (PDSN) 118. Alternatively or additionally, access node 120 may be communicatively coupled to PSTN 128 via a mobile switching center (MSC) 122. Moreover, MSC 122 may be integrated with, or replaced by, an IP multimedia subsystem (IMS) infrastructure.

Although FIG. 1 shows only one BTS, network 100 may include more than one BTS. Each BTS may be communicatively coupled to access node 120 or to other network elements that are communicatively coupled to packet-switched networks 124, 126 and/or PSTN 128. Furthermore, client nodes 110, 112, 114 may be able to transfer ongoing communication sessions from one BTS to another in a handoff process. Network 100 may also include multiple access nodes, PDSNs, and/or MSCs.

The combination of network elements including BTS 116, access node 120, PDSN 118, and MSC 122 may be collectively referred to as a radio access network (RAN). However, a RAN may also be defined to comprise more or fewer elements. For example, a RAN may comprise a single BTS and a single access node. Furthermore, these elements may be combined with one another; for example, a BTS and an access node may be physically co-located or may be components of the same physical element. Regardless of the composition of the RAN, at least one entity within the RAN serves as an access node and may use broadcast/multicast channels to transmit information to client nodes in the RAN's wireless coverage areas.

The entity or entities of the RAN preferably include at least one processor, data storage, and program instructions stored in the data storage and executable by the processor to carry out RAN functions described herein. Similarly, a client node preferably includes at least one processor, data storage, and program instructions stored in the data storage and executable by the processor to carry out client node functions described herein. Furthermore, the client nodes and the RAN may operate in accordance to various types of wireless protocols, such as Code Division Multiple Access (CDMA), Worldwide Interoperability for Microwave Access (WIMAX®), Universal Mobile Telecommunications System (UMTS®), Long Term Evolution (LTE®), IEEE 802.11 (Wifi), or other protocols now known or later developed.

Figure 1B:
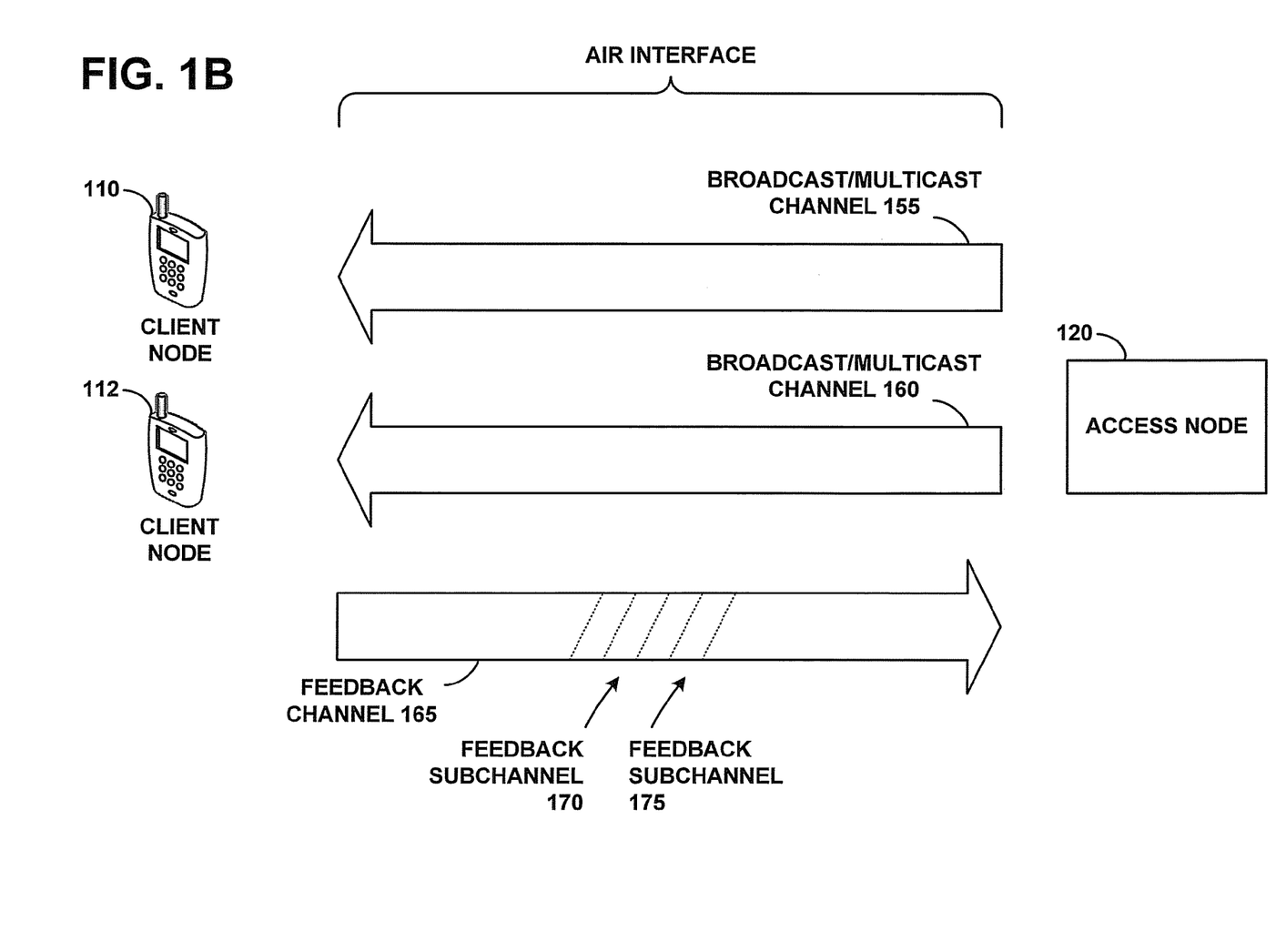
FIG. 1B depicts an air interface in accordance with a preferred embodiment.

FIG. 1B depicts an embodiment of an air interface. Generally, an air interface may include one or more forward links, each defined by a BTS, for transmitting information from one or more access nodes to one or more client nodes. The air interface may also include one or more reverse links for transmitting from the client node(s) to the access node(s). The client node(s) may exchange signaling, voice, data, video, or other media with the access nodes(s) through the forward and reverse links.

An access node may assign one or more forward links and/or one or more reverse links to a particular client node.

Such an assignment may involve the access node instructing the client node to receive information on a particular frequency. In doing so, the client node may receive the information using particular CDMA code(s), and/or during particular TDMA time slot(s). Similarly, the access node may instruct the client node to transmit information on a particular frequency. Similarly, the client may transmit using particular CDMA code(s), and/or during a particular TDMA time slot(s).

Some forward links may be dedicated to a particular client node, in the sense that the information transmitted on the forward link may be intended to be received by the specific client node that has been assigned to that forward link. On the other hand, the air interface may include one or more forward links that serve as broadcast/multicast channels, and one or more reverse links that serve as feedback channels.

In FIG. 1B, forward and reverse channels between client node 110, 112 and access node 120 are depicted. For sake of convenience, FIG. 1B shows these two client nodes. However, other client nodes, such as client node 114 could be present. Client nodes 110, 112 may receive information on broadcast/multicast channels 155, 160, and may transmit information on feedback channel 165. In such an arrangement, the client nodes may both receive information on the same broadcast/multicast channel, or each client node may receive information on a different broadcast/multicast channel. For example, client node 110 and client node 112 may both receive information on broadcast/multicast channel 155, or client node 110 may receive information on broadcast/multicast channel 155 while client node 112 receives information on broadcast/multicast channel 160. Alternatively, either client node 110, client node 112, or both may receive information on both of these broadcast/multicast channels.

Feedback channel 165 may be a reverse link that allows client node 110, 112 to transmit information to access node 120. Feedback channel 165 may be divided into multiple sub-channels, and client nodes 110, 112 may use one or more of these sub-channels to transmit information to access node 120. For example, feedback channel 165 may be divided into sub-channel 170, sub-channel 175, and potentially other sub-channels as well.

These sub-channels may be facilitated using CDMA, TDMA, or some other multiple-access technology. If the sub-channels use CDMA, then each sub-channel may be associated with a unique CDMA code chosen from a group of CDMA codes used by the feedback channel. If the sub-channels use TDMA, then each sub-channel may be a timeslot within the feedback channel.

In full generality, the air interface in FIG. 1B may support more than two broadcast/multicast channels and more than one feedback channel. Furthermore, one or more broadcast/multicast channels may be associated with one or more feedback channels, in that a client node may transmit ACK and/or NACK messages on a given feedback channel in response to packets that it receives on a given broadcast/multicast channel. For example, a client node may receive packets on a given broadcast/multicast channel, and may transmit associated ACK and/or NACK messages on a given feedback channel. Alternatively, a broadcast/multicast channel could be associated in this fashion with one or more sub-channels on a feedback channel, or with sub-channels on multiple feedback channels. Thus, the relationship between broadcast/multicast channels and their associated feedback channels may vary. An operator of a wireless network may find it desirable to associate broadcast/multicast channels with feedback channels such that neither type of channel is overloaded.

In one example, if access node 120 transmits more packets per unit of time on broadcast/multicast channel 155 than it does on broadcast/multicast channel 160, then the client nodes receiving packets on broadcast/multicast channel 155 may transmit more ACK and/or NACK messages than the client nodes receiving packets on broadcast/multicast channel 160. Accordingly, if both broadcast/multicast channels are associated with feedback channel 165, broadcast/multicast channel 155 may be configured to be associated with more sub-channels than broadcast/multicast channel 160.

In another example, if more client nodes are receiving packets on broadcast/multicast channel 155 than on broadcast/multicast channel 160, then the client nodes receiving packets on broadcast/multicast channel 155 may transmit more total ACK and/or NACK messages than the client nodes receiving packets on broadcast/multicast channel 160. Accordingly, if both broadcast/multicast channels are associated with feedback channel 165, broadcast/multicast channel 155 may be configured to be associated with more sub-channels than broadcast/multicast channel 160.

It should be understood that the term "unicast" generally refers to network traffic that is intended to be received by a single recipient, the term "multicast" generally refers to network traffic that is intended to be received by multiple recipients, and the term "broadcast" generally refers to network traffic that is intended to be received by all available recipients. However, a unicast transmission can be received by more than one recipient, a multicast transmission can be received by anywhere from no recipients to all available recipients, and a broadcast transmission may be received by fewer than all available recipients.

Multicast and broadcast transmissions may be used to efficiently deliver information to multiple recipients, without having to specifically target a separate transmission to each and every recipient. Broadcast/multicast channels may support broadcast transmissions, multicast transmissions, or both.

Furthermore, it should be understood that while the term "acknowledgement" usually refers to positive acknowledgements (ACKs), it also may be applied to negative acknowledgements (NACKs), as both ACKs and NACKs are specific types of acknowledgements.

II. Hybrid ARQ

The air interface of communication network 100 and the air interface depicted in FIG. 1B may use hybrid ARQ in order accommodate the lossy nature of wireless channels. An access node may use hybrid ARQ procedures to transmit information to a client node. In such a scenario, for each full packet that the access node seeks to transmit to the client node, the access node may instead transmit between one and N subpackets. Each subpacket may be derived from the full packet, and may contain some combination of data in the full packet and error correcting codes.

The error correcting codes may be used to insert redundant information into a voice or data bit stream contained in full packets so that the client node has a higher probability of being able to properly decode a full packet from one or more subpackets derived from the full packet. Popular types of error correcting codes include XOR codes, Reed-Solomon codes and turbo codes, and a wireless network may use these or other types of error correcting codes.

According to hybrid ARQ procedures, a given subpacket may contain only data, only error correcting codes, or a combination of data and error correcting codes. For instance, if three subpackets are used to transmit a full packet from the access node to the client node, the first subpacket may contain a copy of all of the data from the full packet, while the second and third subpackets may contain only error correcting codes.

In typical hybrid ARQ operation, the access node may transmit a first subpacket to the client node. The first subpacket may be derived from a full packet and may contain one or more error correcting codes. Upon receiving the first subpacket, the client node may attempt to decode the full packet from the content of the first subpacket. If the client node is successful in doing so, it may transmit an H-ARQ ACK message to the access node, indicating that the full packet has been successfully decoded. In this case, the access node may not transmit any further subpackets derived from the full subpacket to the client node.

On the other hand, if the client node cannot decode the full packet from the first subpacket, the client node may transmit an H-ARQ NACK message to the access node, indicating that the client node may require more subpackets derived from the full packet before it can successfully decode the full packet. Alternatively, the client node may expect to receive the first subpacket within a given timeframe (e.g., the hybrid ARQ procedures may be synchronous, in that the timing of subpacket transmissions are substantially coordinated between the access node and the client node). If the client node does not receive the first subpacket within the given timeframe, the client node may transmit an H-ARQ NACK message to the access node, under the presumption that the first subpacket was lost. Upon receiving an H-ARQ NACK for the first subpacket, the access node may transmit a second subpacket to the client node. The second subpacket may also contain data derived from the full packet, as well as one or more error correcting codes.

The process of the access node transmitting subpackets and the client node responding with a NACK message continues until either: (1) the client node successfully decodes the full packet from one or more subpackets and responds with an ACK message for one of these subpackets, or (2) the client node has transmitted a NACK message for N subpackets derived from the full packet. Here, N is typically a value configured at the access node and/or configured at the client node. For purposes of example, N may take on a value of 1, 4, 10, or some other positive integer.

The Nth subpacket may be referred to as the "last" subpacket, as the access node preferably will not transmit any further subpackets derived from the full packet if the Nth subpacket is NACKed. The client node may inform the access node that the Nth subpacket is the last subpacket by using an L-ARQ ACK or L-ARQ NACK message. The client node may transmit an L-ARQ ACK message when it successfully decodes the full packet from the combination of the N subpackets derived from the full packet. On the other hand, the client node may transmit an L-ARQ NACK message when it fails to decode the full packet from the combination of the N subpackets it received.

The hybrid ARQ procedures for a packet may complete when the client node transmits a P-ARQ ACK or a P-ARQ NACK message. A P-ARQ ACK message acknowledges the full packet, while a P-ARQ NACK message negatively acknowledges the full packet. A client node may be arranged to transmit a P-ARQ message to an access node some fixed offset of time after the client node receives the first subpacket. Thus, even if the full packet is successfully decoded from the first subpacket, the client node may wait several milliseconds or several tens of milliseconds, or even longer, to transmit a P-ARQ message acknowledging the packet.

When the access node receives an L-ARQ NACK, it may either retransmit the full packet by starting the hybrid ARQ transmission process over again for the full packet, or it may refrain from retransmitting the full packet. The access node may take the former option when it is transmitting data for best-effort services. Best effort services can usually absorb the additional latency due to a retransmission without an appreciable impact on performance, however the loss of a packet can significantly disrupt a best effort service. On the other hand, the access node is likely to take the latter option when it is transmitting data for real-time services. Real-time services can usually withstand the loss of a packet without an appreciable impact on performance, but may not be able to absorb the latency associated with retransmission of a packet.

An air interface may facilitate hybrid ARQ procedures by associating each hybrid ARQ ACK and NACK message transmitted on a reverse link channel (such as a feedback channel or a sub-channel of a feedback channel) with three bits. These three bits may be contained in a header associated with the ACK or NACK message. The bits signal the type of message as H-ARQ, L-ARQ, and/or P-ARQ. The value of each bit (either zero or one) may determine whether the message is an ACK or a NACK.

Figure 2A:
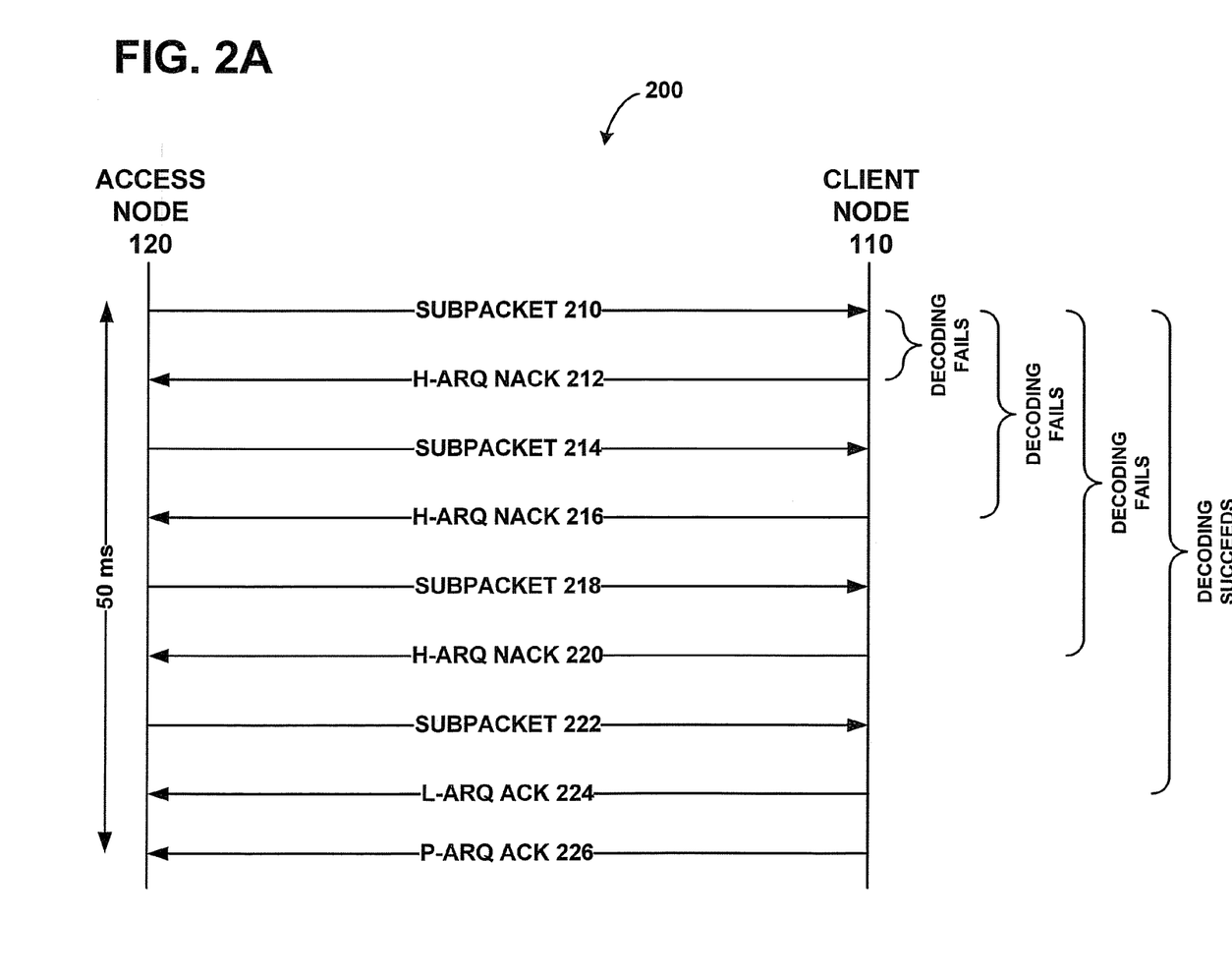
FIG. 2A depicts a call flow in accordance with a preferred embodiment.

FIG. 2A depicts an example call flow 200 of hybrid ARQ procedures for a single full packet, where N is set to 4. (Note that all subpackets 210, 214, 218, 222 may be derived from the full packet.) In the process shown, access node 120 may first transmit subpacket 210 to client node 110. Client node 110 may then fail to decode the full packet from subpacket 210, so it may transmit H-ARQ NACK 212 to access node 120. In response, access node 120 may responsively transmit subpacket 214 to client node 110, and then client node 110 may then attempt to decode the full packet from the combination of subpacket 210 and subpacket 214. Failing to do so, client node 110 may then transmit H-ARQ NACK 216 to access node 120.

Once again, access node 120 may transmit another subpacket 218 to client node 110, and client node 110 may attempt, but fail, to decode the full packet from the combination of subpacket 210, subpacket 214, and subpacket 218. Accordingly, client node 110 may transmit H-ARQ NACK 220 to access node 120. Access node 120 may then transmit subpacket 222, the fourth subpacket, to client node 110. This time, client node 110 may succeed in decoding the full packet from the combination of subpacket 210, subpacket 214, subpacket 218, and subpacket 222, and may therefore transmit L-ARQ ACK 224 to access node 120. Note that client node 110 uses an L-ARQ ACK rather than an H-ARQ ACK for this message, because N is set to 4 and client node 110 is acknowledging the Nth subpacket.

At this point, client node 110 has successfully received the entire full packet. Accordingly, client node 110 may then transmit P-ARQ ACK 226 to access node 120, thus acknowledging the receipt of the full packet. In call flow 200, P-ARQ ACK 226 is transmitted approximately 50 milliseconds after client node 110 receives subpacket 210. This particular delay period was chosen for purposes of illustration, and other delay periods can be used.

Once client node 110 transmits P-ARQ ACK 226, it may pass the decoded full packet up to higher layer protocols, such as a data link layer or network layer protocol, for further processing. Once access node 120 receives P-ARQ ACK 226, it may delete the full packet from its transmit buffer.

Figure 2B:
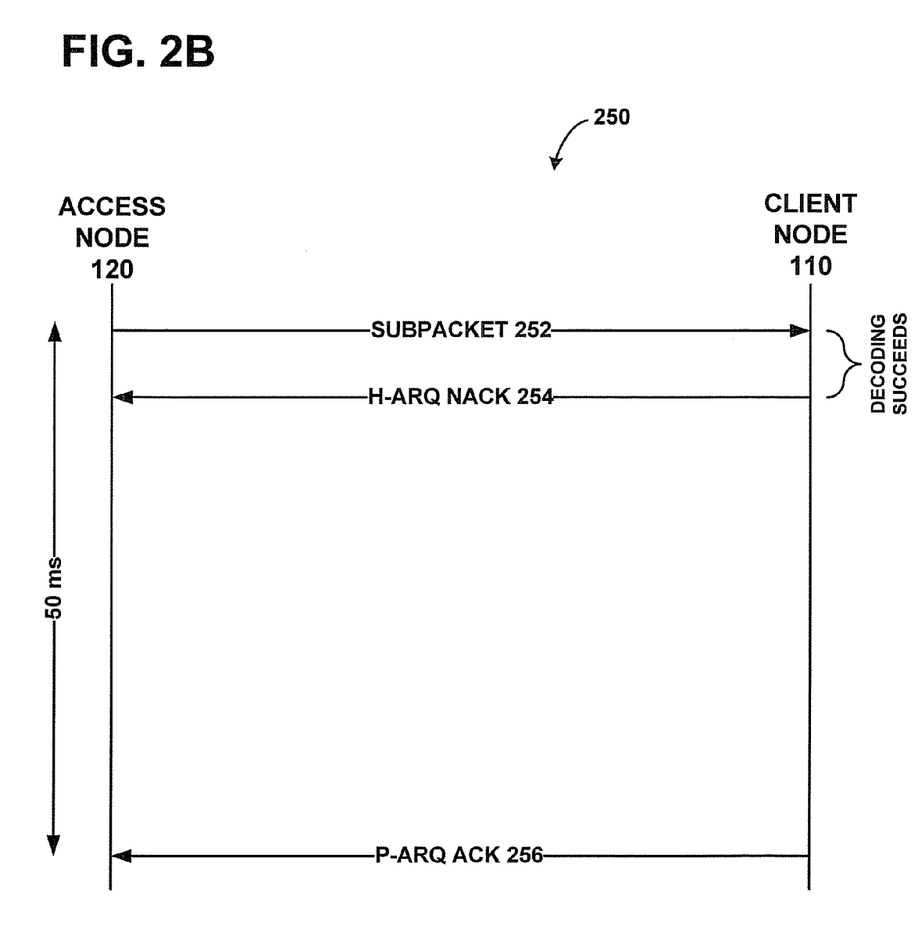
FIG. 2B depicts another call flow in accordance with a preferred embodiment.

FIG. 2B depicts another example call flow 250. In this call flow, access node 120 seeks to transmit the data in a full packet to client node 110. Accordingly, access node 120 may transmit a first subpacket, subpacket 252, to client node 110. Client node 110 may successfully decode the full packet from just subpacket 252, and therefore may transmit H-ARQ ACK 254 to access node 120. At this point, the decoded full packet can be processed further by client node 110, and client node 110 may transmit a P-ARQ ACK message to access node 120. However, client node 110 may be configured to transmit the P-ARQ ACK message approximately 50 milliseconds after receipt of the first subpacket. Thus, client node 110 may wait approximately 50 milliseconds before transmitting P-ARQ ACK 256 to access node 120. Alternatively, client node 110 may transmit the P-ARQ ACK 256 at a different time.

III. Hybrid ARQ on Broadcast/Multicast Channels

The description above focuses on hybrid ARQ procedures between an access node and a single client node. However, hybrid ARQ procedures may be used on broadcast/multicast channels and their associated feedback channels as well. In such a scenario, multiple client nodes, potentially tens, hundreds, or thousands of client nodes, may be receiving the same subpackets on a broadcast/multicast channel. This may result in some or all of these client nodes transmitting ACKs and/or NACKs for each subpacket to the access node. Thus, the number of ACK and/or NACK messages that the access node receives for each subpacket that it transmits may grow linearly with the number of client nodes receiving those subpackets. This can lead to the access node becoming overloaded with an implosion of ACK and/or NACK messages, which could potentially degrade overall system performance. Additionally, the feedback channel may not have the capacity to support all of these ACK and/or NACK messages. Therefore, it may be advantageous to reduce the number of ACK and/or NACK messages transmitted by client nodes.

In one embodiment, the client nodes are configured to only transmit NACK messages on feedback channels. Thus, so long as the client nodes are successfully decoding full packets received on a broadcast/multicast channel, there may be no ACK messages transmitted in response to these subpackets. However, when a client node does not successfully receive or decode a subpacket on a broadcast/multicast channel, the client node may transmit a NACK on the feedback channel. As a result, access nodes may only receive NACK messages on the feedback channel, thereby reducing the load on both the feedback channel and on the access node.

When multiple client nodes are receiving subpackets on a broadcast/multicast channel, each of these clients could potentially be in a different location and/or subject to a different quality of wireless coverage. Some client nodes may be subject to good wireless coverage quality because, for example, they are near a BTS. However, other client nodes may be subject to poor wireless coverage quality because, for example, they are far from a BTS, or there is some obstruction between the client node and the BTS that impairs the quality of the client nodes' wireless coverage. Therefore, any given subpacket that an access node transmits on a broadcast/multicast channel may be properly received by some client nodes, but may not be properly received by other client nodes. Thus, if there are M client nodes receiving subpackets on a broadcast/multicast channel, between 0 and M NACK messages may be transmitted by these nodes in response to each subpacket.

An access node may determine whether to transmit a subsequent subpacket based on the number of client nodes that NACK any given subpacket. (It should be understood that, according to hybrid ARQ procedures, a subsequent subpacket is preferably a subpacket that is also derived from that same full packet as the previously transmitted subpacket.) This determination may be based on the access node receiving a pre-determined absolute number of NACKs (e.g., 5, 10, 100, etc.) in response to a given subpacket. Alternatively, the determination may be based on the access node receiving NACKs in response to a given subpacket from more than a pre-determined percentage of client nodes (e.g., 5%, 10%, 25%, etc.), or some other means. A benefit of the access node transmitting a subsequent subpacket only when the number of NACKs exceeds such a pre-determined threshold is that the access node transmits the subsequent subpacket only when a substantial number of client nodes have not properly received and decoded the full packet.

For example, assume that 100 client nodes are receiving hybrid ARQ subpackets on a broadcast/multicast channel. If only one of those 100 client nodes transmits a NACK message in response to a given subpacket, then it may be preferable for the access node to refrain from transmitting a subsequent subpacket. In other words, the cost, in terms of access node processing, broadcast/multicast channel utilization, and client node processing, may outweigh any benefit that such a transmission may provide for the single client node that NACKed the given subpacket. On the other hand, if 25 of the 100 client nodes transmit NACKs in response to the given subpacket, the benefit of giving those 25 client nodes the opportunity to receive the subsequent subpacket may outweigh the cost of transmitting the subsequent subpacket.

Such a pre-determined threshold may be configurable by an operator of the access node. In this way, the operator can tune the threshold in order to adapt the behavior of the access node to different scenarios. Alternatively or additionally, the access node may dynamically adjust the pre-determined threshold based on, for example, the number of client nodes receiving subpackets on a given broadcast/multicast channel, measurements of wireless coverage quality, or other factors.

Thus, from time to time, an access node may determine not to transmit subsequent subpackets derived from the full packet, even if it has received one or more NACK messages. This may result in one or more client nodes failing to decode a full packet. However, broadcast/multicast channels typically are used to transport real time media, such as streaming audio and video. Even if a client node fails to receive one or more subpackets of a real time media stream, such a failure may not be perceptible to a human user. In situations where a broadcast/multicast channel is used to transport non-real time media, it is likely that a higher layer protocol will retransmit the information in the subpacket that the client node failed to receive. Thus, regardless of the nature of the information being transmitting on a broadcast/multicast channel, there may be little or no deleterious impact on the recipient of the information when an access node chooses to not transmit a subsequent subpacket in response to receiving one or more NACK messages.

When transmitting a NACK message on a feedback channel, a client node may choose to transmit the NACK message on a sub-channel of the feedback channel. If multiple sub-channels are available to the client node, the client node may use various techniques to choose a sub-channel. For instance, the client node may randomly choose the sub-channel. Alternatively, the client node may choose the sub-channel in a deterministic fashion. One method that a client node may utilize to deterministically choose a sub-channel would be to perform a hash function on a unique identifier of the client node in order to map the client node to a sub-channel. Such a unique identifier may take the form of an International Mobile Subscriber Identifier (IMSI), a Mobile Equipment Identifier (MEID), a media-access control (MAC) address, or the unique identifier may take some other form.

For example, consider a feedback channel that supports sub-channel S1 and sub-channel S2. Client node 110 may choose sub-channel S1 randomly, according to an established procedure, or client node 110 may be deterministically assigned to use sub-channel S1. An established procedure may be, for example, choosing sub-channels in a round-robin fashion, or choosing sub-channels based on some aspect of the load on the sub-channels. Client node 110 may also choose sub-channel S2 randomly or according to an established procedure. Sub-channel S2 may be the same sub-channel as sub-channel S1, or sub-channel S2 may be a different sub-channel from sub-channel S1. For instance, client node 110 may purposely choose sub-channel S2 to be different from sub-channel S1.

Once a sub-channel is chosen, the client node may transmit one or more NACK messages on the sub-channel. However, regardless of how the sub-channel is chosen, it may be possible for multiple client nodes to transmit NACK messages on the same sub-channel at the same time, resulting in a collision whereby none of these NACK messages may be received by the access node. In order to accommodate such a situation, a client node may wait for a period of time after transmitting a NACK message. In this way, the client node may have an opportunity to receive a subsequent subpacket on the broadcast/multicast channel. If the client node does not receive this subsequent subpacket during this period of time, the client node may choose a sub-channel (possibly a different sub-channel) and transmit another NACK message to the access node. The client node may repeat this process a number of times until the client node properly receives a subsequent subpacket.

Figure 2C:
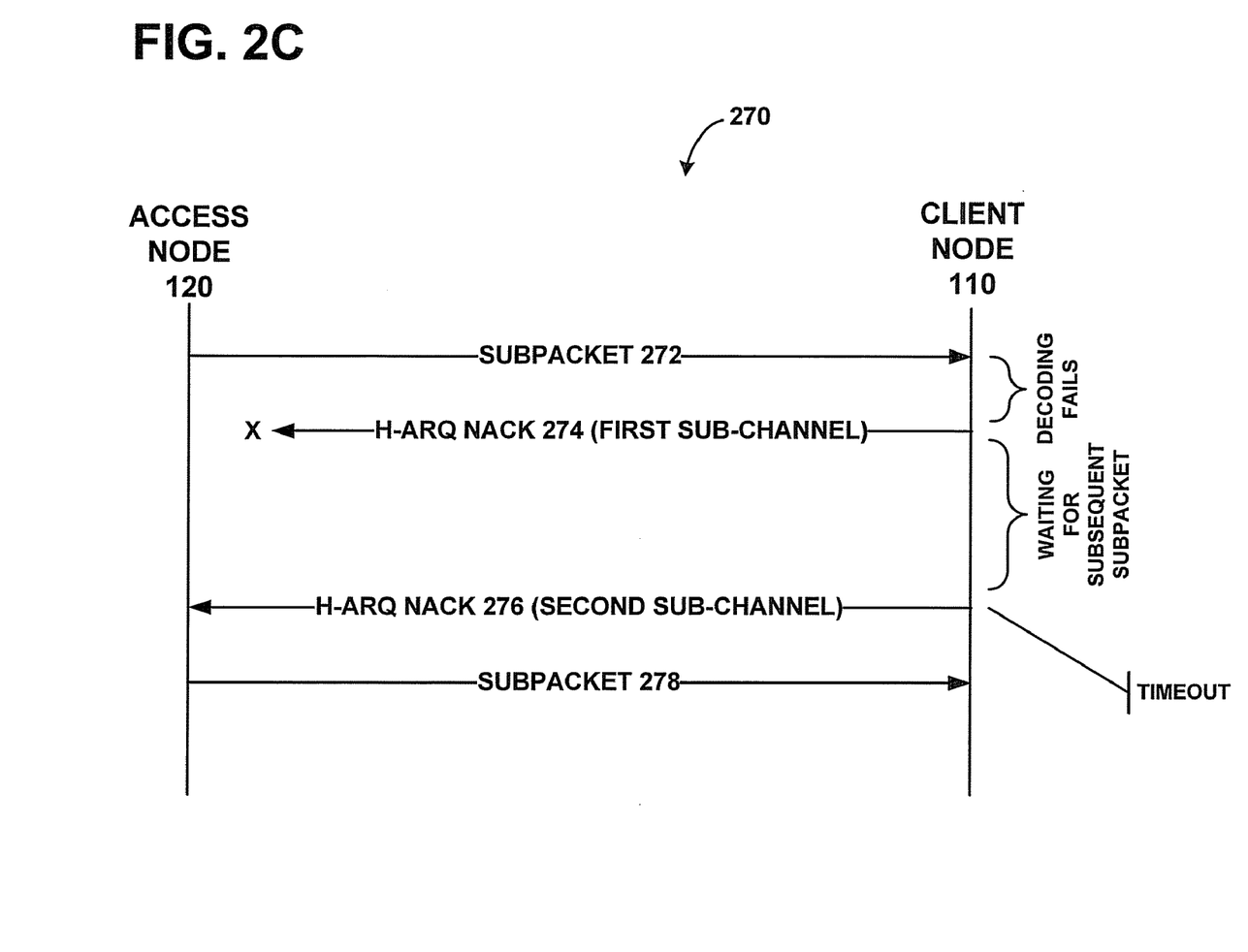
FIG. 2C depicts yet another call flow in accordance with a preferred embodiment.

FIG. 2C is an example call flow 270 that illustrates client node 110 choosing a sub-channel to use for transmitting a NACK message to access node 120, failing to receive a subsequent subpacket from access node 120, and then choosing another sub-channel to use for transmitting another NACK message to access node 120. Client node 110 receives subpacket 272 and, from it, may attempt to decode a full packet. Failing to do so, client node 110 may transmit H-ARQ NACK 274 on a first sub-channel. Then, client node 110 may wait to receive a subsequent subpacket from access node 120. If for example, another client node has chosen to also transmit a NACK on the first sub-channel at the same time, then the NACKs may collide, causing both to be lost. Eventually, client node 110 may time out and transmit H-ARQ NACK 276 on a second sub-channel. In response to receiving H-ARQ NACK 276, access node 120 may transmit subpacket 278, a subpacket that is subsequent to subpacket 272.

Figure 3A:
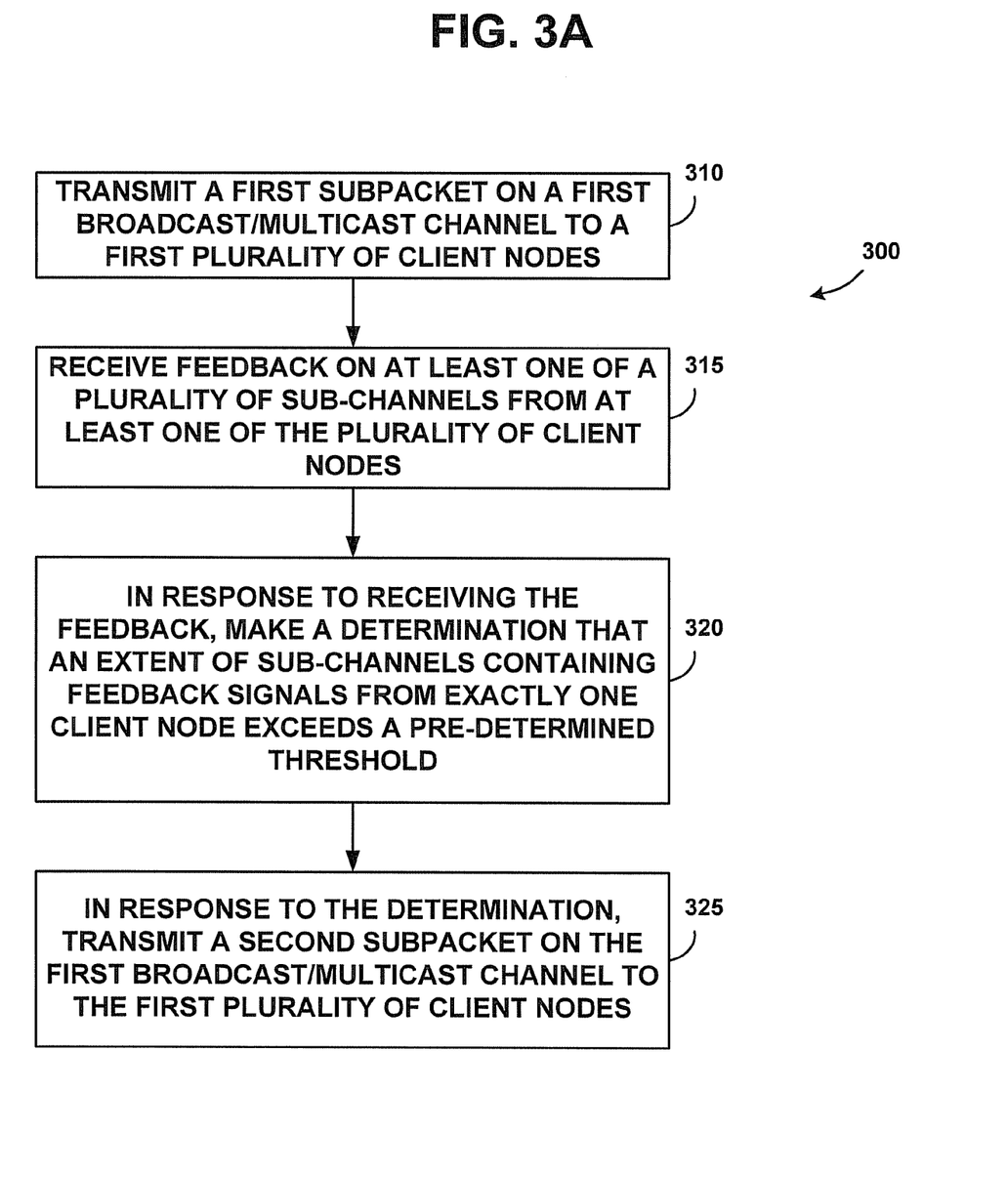
FIG. 3A depicts a flow chart in accordance with a preferred embodiment.

FIG. 3A is a flow chart 300 depicting an example method for hybrid ARQ on broadcast/multicast channels. At step 310, an access node may transmit a first subpacket, derived from a full packet, on a first broadcast/multicast channel to a first plurality of client nodes. At step 315, the access node may receive feedback, on at least one sub-channel, from at least one of the plurality of client nodes. This feedback may take the form of one or more NACK messages transmitted by one or more client nodes in response to being unable to decode a full packet from the first subpacket. Thus, the access node may receive multiple NACK messages. Preferably, each NACK message is received from a unique client node.

At step 320, in response to receiving the feedback, the access node may make a determination that an extent of sub-channels containing feedback signals from exactly one client node exceeds a pre-determined threshold. As described above, it may be beneficial for the access node to transmit a second subpacket only if the number of client nodes that NACK the first subpacket exceeds the pre-determined threshold. This way, the access node avoids transmitting the second subpacket when a relatively small number of client nodes fail to receive or decode the first subpacket. Accordingly, at step 325, in response to this determination, the access node may transmit a second subpacket, also derived from the full packet, on the first broadcast/multicast channel.

As described above, the sub-channels of the feedback channel may be created by using CDMA or TDMA techniques. For instance, under CDMA, logical sub-channels can be created through the use of a set of unique CDMA codes on the feedback channel. Similarly, under TDMA, logical sub-channels can be created through the use of multiple timeslots on the feedback channel.

Furthermore, the access node may also transmit subpackets on a second broadcast/multicast channel to a second plurality of client nodes. The plurality of sub-channels may be divided into a first group and a second group, where the first group is associated with the first broadcast/multicast channel and the second group is associated with the second broadcast multicast channel. Thus, the access node may transmit subpackets on the first broadcast/multicast channel, and may receive associated feedback from the first plurality of client nodes on the first group of sub-channels. Similarly, the access node may transmit subpackets on the second broadcast/multicast channel, and may receive feedback from the second plurality of client nodes on the second group of sub-channels.

The number of sub-channels in the first group may be chosen based on the number of client nodes in the first plurality of client nodes, and the number of sub-channels in the second group may be chosen based on a number of client nodes in the second plurality of client nodes. In this way, the number of sub-channels associated with each broadcast/multicast channel can be scaled appropriately to reflect the excepted or actual volume of feedback traffic associated with each broadcast/multicast channel.

Figure 3B:
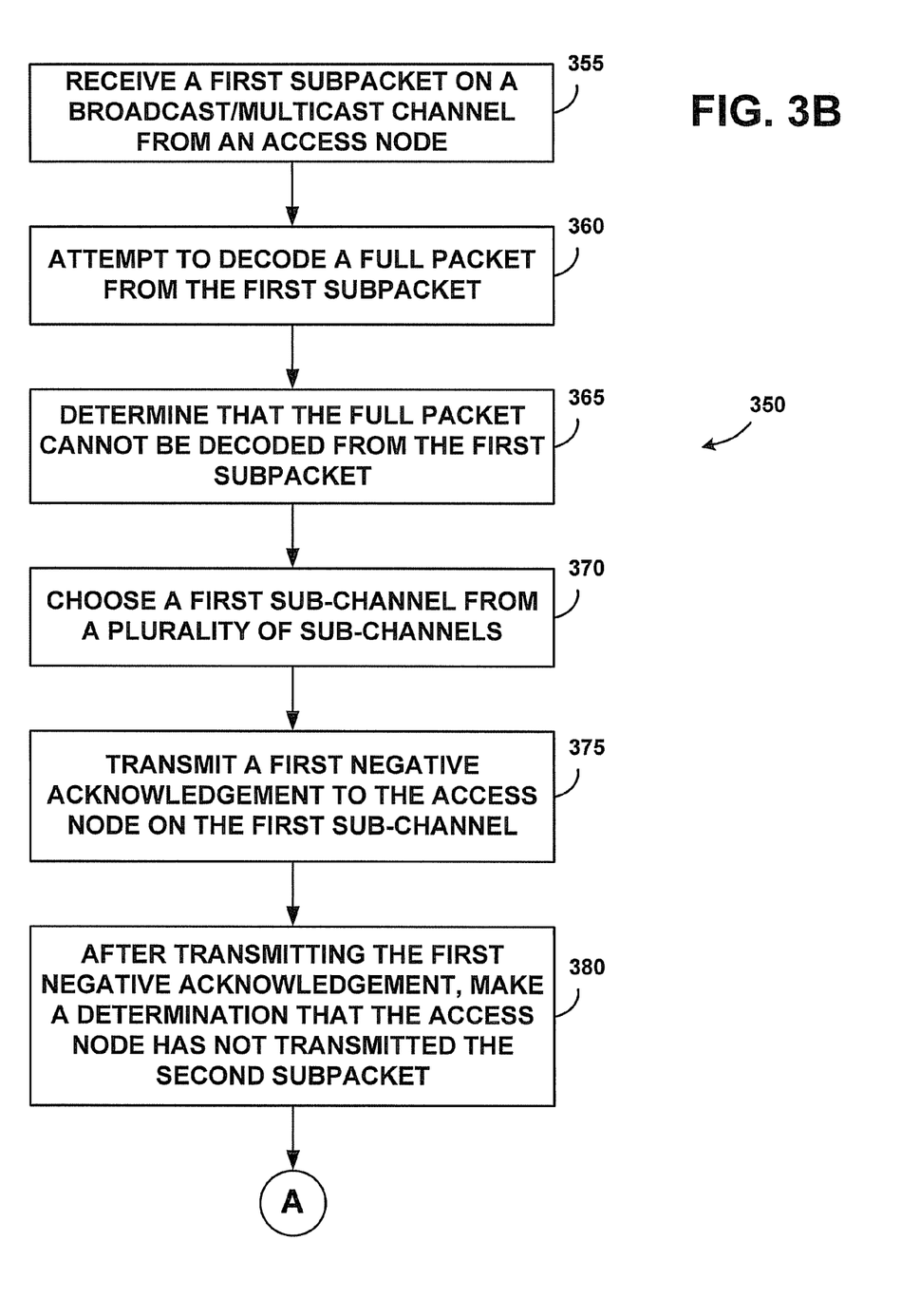
FIGS. 3B and 3C depict another flow chart in accordance with a preferred embodiment.
Figure 3C:
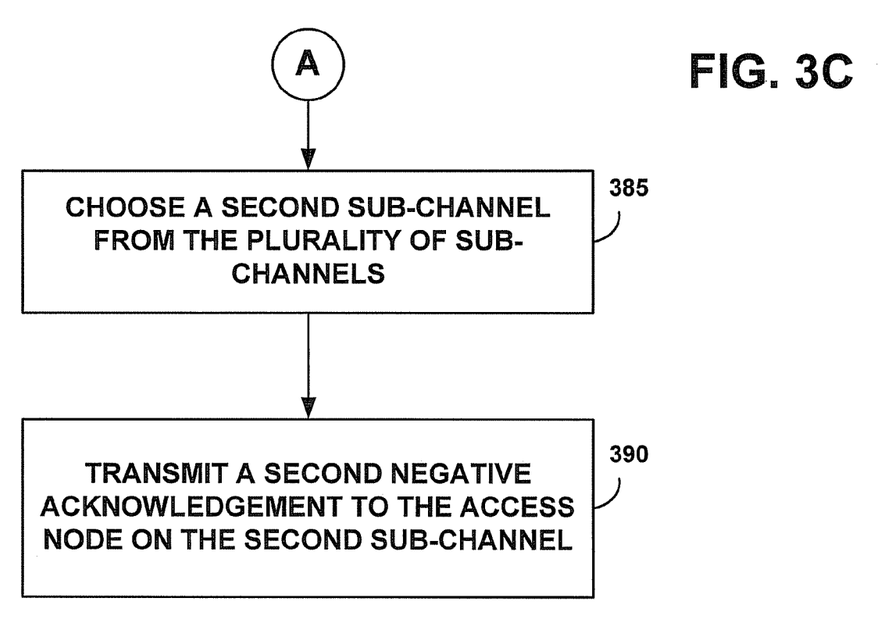

FIGS. 3B and 3C are a flow chart 350 depicting an example method for hybrid ARQ on broadcast/multicast channels. At step 355, a client node may receive a first subpacket on a broadcast/multicast channel from an access node. The first subpacket may be derived from a full packet. At step 360, the client node may attempt to decode the full packet from the first subpacket. At step 365, the client node may determine that the first subpacket cannot be fully decoded from the first subpacket.

The client node may transmit a NACK message to the access node in order to trigger the access node to transmit a subsequent subpacket, where the subsequent subpacket also is derived from the full packet. Accordingly, at step 370, the client node may choose a first sub-channel from a plurality of sub-channels. At step 375, the client node may transmit a first NACK message to the access node on the chosen first sub-channel. Note that the choice of a first sub-channel that takes place at step 370 may instead occur at a previous point in time. In other words, the client node may pre-select the first sub-channel in order to, for example, reduce processing delays associated with transmitting a NACK message.

As an alternative to steps 355, 360 and 365, the first subpacket may be lost between the access node and the client node. In this case, the client node may have expected to receive the first subpacket during a given timeframe. When the client node fails to receive the first subpacket during the given timeframe, the client node may transmit a NACK message to the access node on a chosen or pre-selected sub-channel.

At step 380, after transmitting the first NACK message, the client node may determine that the client node has not received a subsequent subpacket from the access node. The client node may wait for a random period of time before or after making the determination. In response to the determination, at step 385, the client node may choose a second sub-channel that may be different from the first sub-channel.

If the client waits the random period of time, the second sub-channel may be chosen after the client waits for this period of time. At step 390, the client node may transmit a second NACK message to the access node on the second sub-channel. In doing so, the client node may be seeking to trigger the access node to transmit a subsequent subpacket.

Furthermore, the client node may (1) choose the first sub-channel in response to determining that the first subpacket cannot be fully decoded, (2) transmit the first NACK message in response to choosing the first sub-channel, (3) choose the second sub-channel in response to making the determination that the access node has not transmitted the second subpacket, and (4) transmit the second NACK message in response to choosing the second sub-channel. The client node may choose the first sub-channel and/or the second sub-channel randomly.

Additionally, the air interface used by the client node and the access node may support multiple broadcast/multicast channels, and each of these broadcast/multicast channels may be associated with a non-overlapping group of sub-channels. Thus, choosing the first sub-channel may involve choosing the first sub-channel from a group of the sub-channels that are associated with the broadcast/multicast channel, and choosing the second sub-channel involves choosing the second sub-channel from the group of the sub-channels that are also associated with the broadcast/multicast channel. Moreover, the number of sub-channels in the group of sub-channels associated with the broadcast/multicast channel may be based on a number of client nodes receiving subpackets on the broadcast/multicast channel.

It should be understood that methods 300 and 350 may contain more or fewer steps than those discussed herein, and these steps may occur in a different order than illustrated or discussed herein. Furthermore, these methods may be combined with one another, in whole or in part, to form additional embodiments within the scope of the invention.

IV. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method, at an access node, for acknowledging information in a communication system, wherein the communication system includes a first plurality of client nodes communicatively coupled to the access node, wherein the access node transmits subpackets on a first broadcast/multicast channel to the first plurality of client nodes according to hybrid ARQ, wherein the client nodes transmit feedback to the access node on a feedback channel, and wherein the feedback channel contains a plurality of sub-channels, the method comprising:

transmitting a first subpacket on the first broadcast/multicast channel to the first plurality of client nodes;

receiving feedback on at least one of the plurality of sub-channels, from at least one of the plurality of client nodes, wherein at least one sub-channel of the plurality of sub-channels carries a feedback signal from exactly one client node of the first plurality of client nodes;

in response to receiving the feedback, making a determination that an extent of sub-channels containing feedback signals from exactly one client node exceeds a pre-determined threshold; and in response to the determination, transmitting a second subpacket on the first broadcast/multicast channel to the first plurality of client nodes.

2. The method of claim 1, wherein the feedback channel operates according to code division multiple access (CDMA), and wherein each sub-channel is associated with a unique CDMA code chosen from a group of CDMA codes used by the feedback channel.

3. The method of claim 1, wherein the feedback channel operates according to time division multiple access (TDMA), and wherein each sub-channel is a timeslot within the feedback channel.

4. The method of claim 1, wherein the pre-determined threshold is based on a percentage of client nodes served by the access node.

5. The method of claim 1, wherein the feedback signal from exactly one client node of the first plurality of client nodes comprises a negative acknowledgement.

6. The method of claim 1, wherein the communication system also includes a second plurality of client nodes communicatively coupled to the access node, wherein the access node transmits subpackets on a second broadcast/multicast channel to the second plurality of client nodes according to the hybrid ARQ scheme, the method further comprising:

dividing the plurality of sub-channels into a first group and a second group, wherein the access node receives feedback from the first plurality of client nodes on the first group of sub-channels, and wherein the access node receives feedback from the second plurality of client nodes on the second group of sub-channels.

7. The method of claim 6, wherein a number of sub-channels in the first group is chosen based on a number of client nodes in the first plurality of client nodes, and a number of sub-channels in the second group is chosen based on a number of client nodes in the second plurality of client nodes.

8. The method of claim 1, wherein the first subpacket and second subpacket are both derived from an full packet according to hybrid ARQ procedures.

9. A method, at a first client node, for acknowledging information in a communication system, wherein the communication system includes an access node, wherein the access node transmits subpackets on a broadcast/multicast channel to the first client node according to hybrid ARQ, wherein the client node transmits feedback to the access node on a feedback channel, and wherein the feedback channel contains a plurality of sub-channels, the method comprising:

receiving a first subpacket on the broadcast/multicast channel from the access node, wherein the first subpacket is derived from a full packet;

attempting to decode the full packet from the first subpacket;

determining that the full packet cannot be decoded from the first subpacket;

choosing a first sub-channel from the plurality of sub-channels;

transmitting a first negative acknowledgement to the access node on the first sub-channel, thereby seeking to trigger the access node to transmit a second subpacket, wherein the second subpacket also is derived from the full packet;

after transmitting the first negative acknowledgement, making a determination that the access node has not transmitted the second subpacket;

choosing a second sub-channel from the plurality of sub-channels, wherein the second sub-channel is different from the first sub-channel; and transmitting a second negative acknowledgement to the access node on the second sub-channel, thereby seeking to trigger the access node to transmit the second subpacket.

10. The method of claim 9, wherein the feedback channel operates according to code division multiple access (CDMA), and wherein each sub-channel is associated with a unique CDMA code chosen from a group of CDMA codes used by the feedback channel.

11. The method of claim 9, wherein the feedback channel operates according to time division multiple access (TDMA), and wherein each sub-channel is a timeslot within the feedback channel.

12. The method of claim 9, wherein choosing the first sub-channel comprises choosing the first sub-channel randomly, and wherein choosing the second sub-channel comprises choosing the second sub-channel randomly.

13. The method of claim 9, wherein the communication system supports multiple broadcast/multicast channels, and wherein each of the broadcast/multicast channels is associated with a non-overlapping group of sub-channels.

14. The method of claim 13, wherein choosing the first sub-channel comprises choosing the first sub-channel from a group of the sub-channels that are associated with the broadcast/multicast channel, and wherein choosing the second sub-channel comprises choosing the second sub-channel from the group of the sub-channels that are associated with the broadcast/multicast channel.

15. The method of claim 14, wherein a number of sub-channels in the group of sub-channels is based on a number of client nodes receiving subpackets on the broadcast/multicast channel.

16. The method of claim 9, wherein choosing the first sub-channel occurs in response to determining that the first subpacket cannot be fully decoded, wherein transmitting a first negative acknowledgement occurs in response to choosing the first sub-channel, wherein choosing the second sub-channel occurs in response to making the determination that the access node has not transmitted the second subpacket, and wherein transmitting the second negative acknowledgement occurs in response to choosing the second sub-channel.

17. The method of claim 9, further comprising:
after determining that the access node has not transmitted the second subpacket, waiting a random period of time before transmitting the second negative acknowledgement to the access node.

18. A communication system comprising:
a BTS radiating to define a broadcast/multicast channel and a feedback channel, wherein the feedback channel contains a plurality of sub-channels;
an access node; and
a first client node, wherein the access node transmits a first subpacket and a second subpacket on the broadcast/multicast channel according to hybrid ARQ procedures, wherein the first subpacket and the second subpacket are derived from a full packet, wherein the first client node (1) receives the first subpacket, (2) fails to decode the full packet from the first subpacket, (3) randomly chooses a first sub-channel from the plurality of sub-channels, and (4) transmits a first negative acknowledgment to the access node on the first sub-channel, wherein the first negative acknowledgment seeks to trigger the access node into transmitting the second subpacket, and wherein the access node transmits the second subpacket in response to the access node receiving a number of negative acknowledgments that exceeds a pre-determined threshold.

19. The system of claim 18, further comprising:
a second client node that (1) receives the first subpacket, (2) fails to decode the full packet from the first subpacket, (3) randomly chooses the first sub-channel from the plurality of sub-channels, and (4) transmits a third negative acknowledgment to the access node on the first sub-channel, the third negative acknowledgment thereby colliding with the first negative acknowledgment.

20. The method of claim 18, wherein the feedback channel operates according to code division multiple access (CDMA), and wherein each sub-channel is associated with a unique CDMA code chosen from a group of CDMA codes used by the feedback channel.

21. The method of claim 18, wherein the feedback channel operates according to time division multiple access (TDMA), and wherein each sub-channel is a timeslot within the feedback channel.

* * * * *